Figure 13:
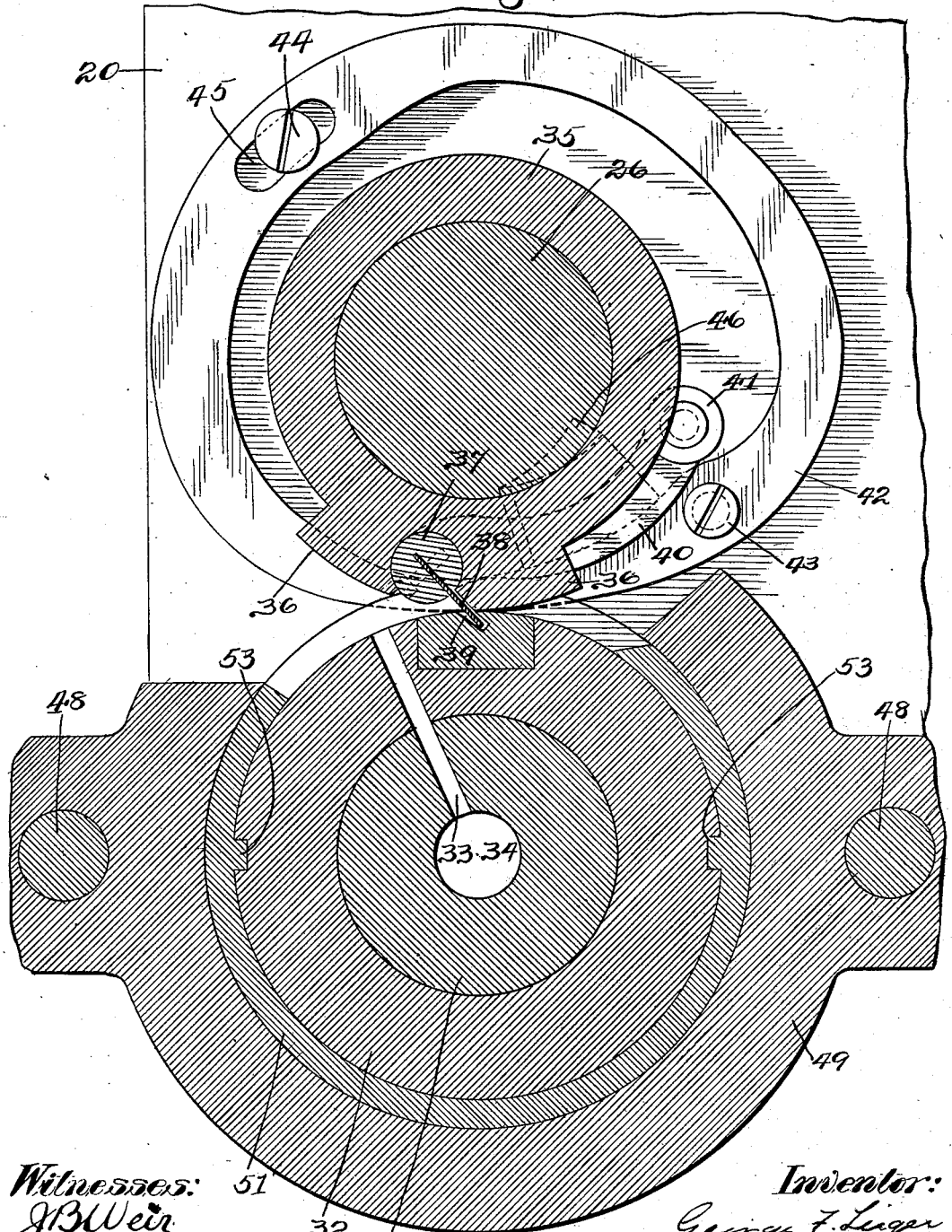

No. 732,004. PATENTED JUNE 23, 1903.
G. F. LEIGER.
MACHINE FOR MAKING CAN BODIES.
APPLICATION FILED NOV. 20, 1902.
NO MODEL. 13 SHEETS—SHEET 1.
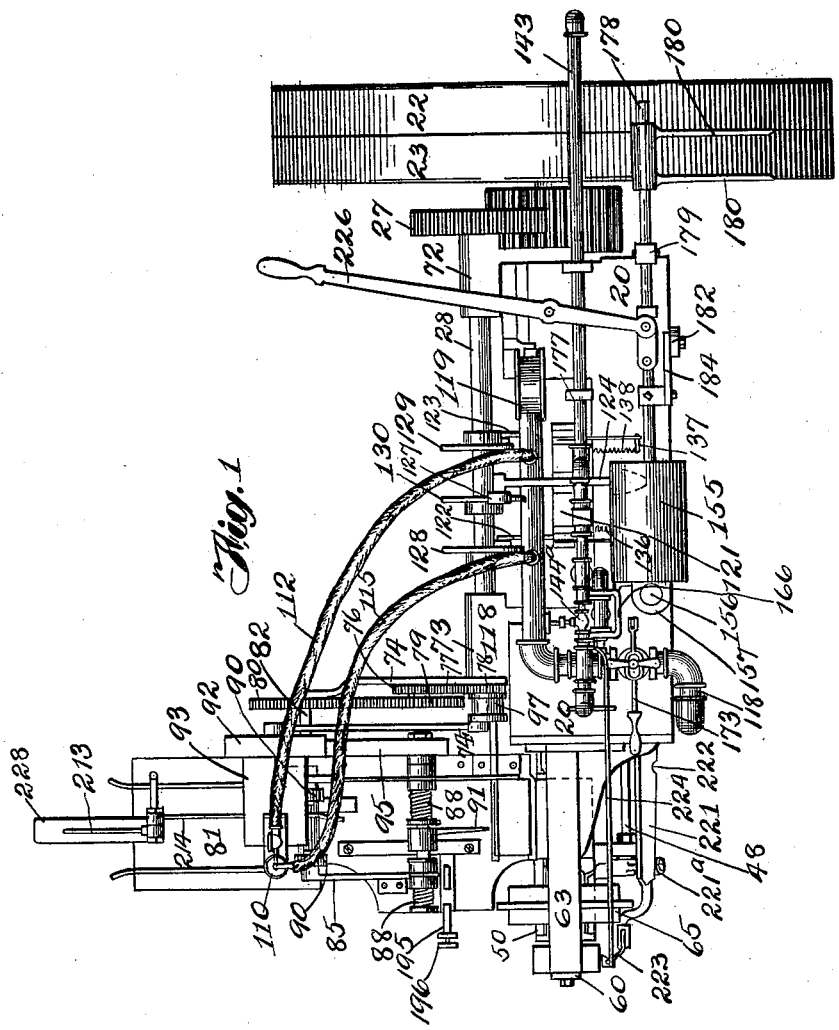
Witnesses:
JB Weir
Ba D Perry
Inventor:
George F. Leiger
by
Bond, Adams, Pickard & Jackson
Attys

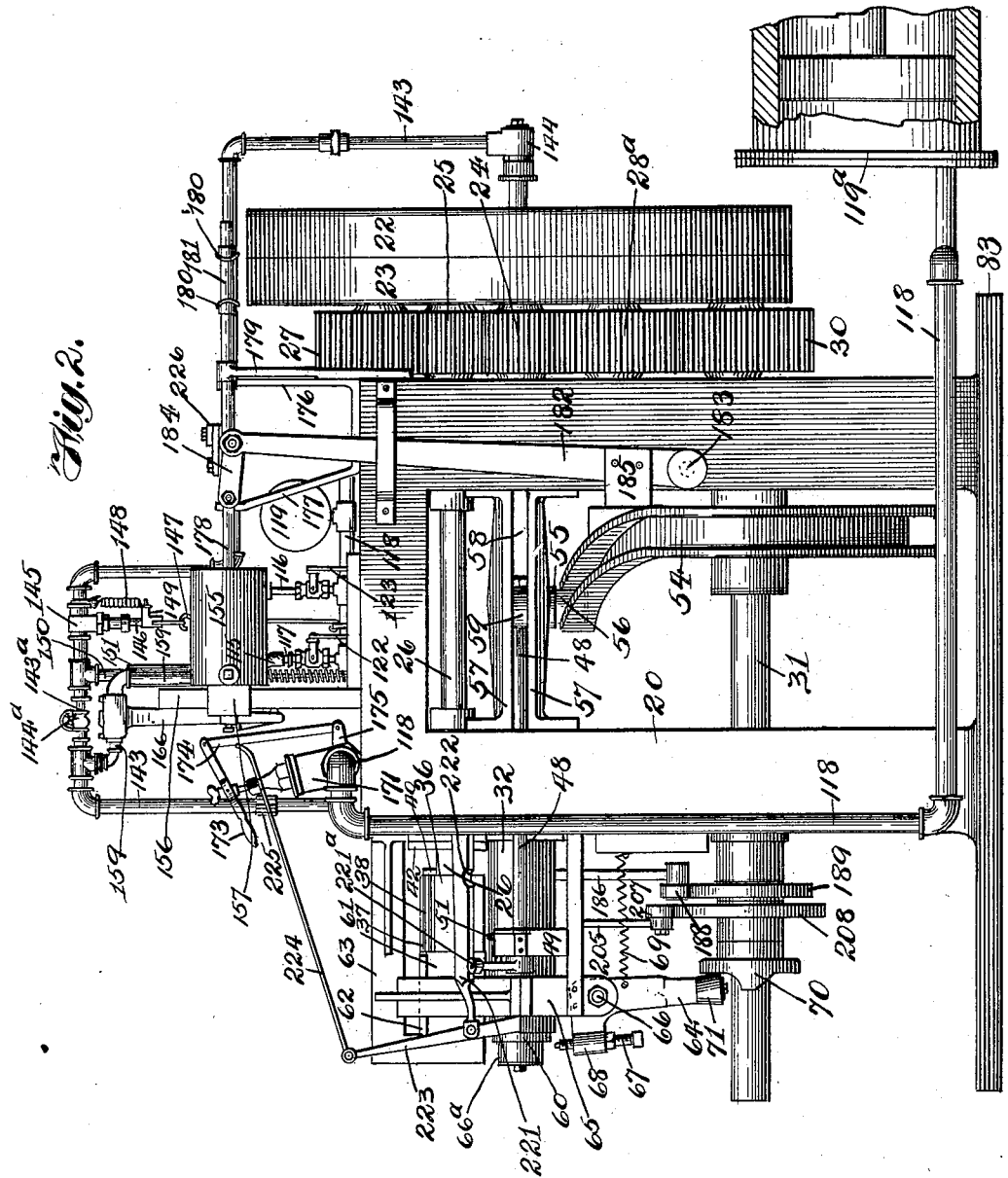

No. 732,004. PATENTED JUNE 23, 1903.
G. F. LEIGER.
MACHINE FOR MAKING CAN BODIES.
APPLICATION FILED NOV. 20, 1902.
NO MODEL. 13 SHEETS—SHEET 3.
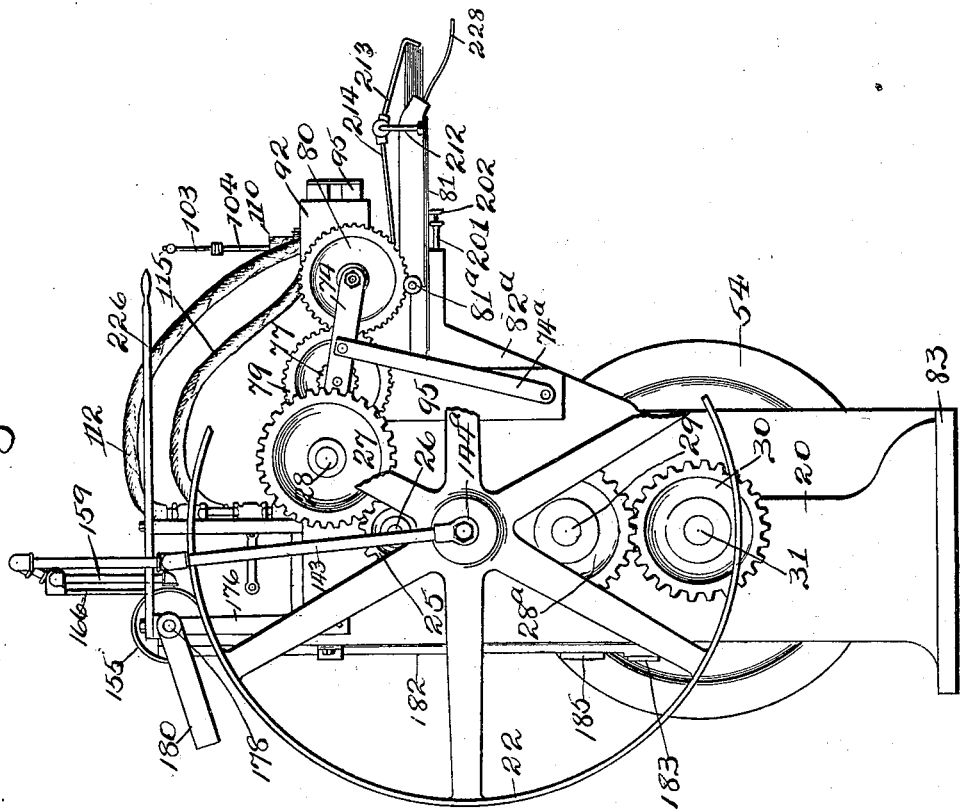

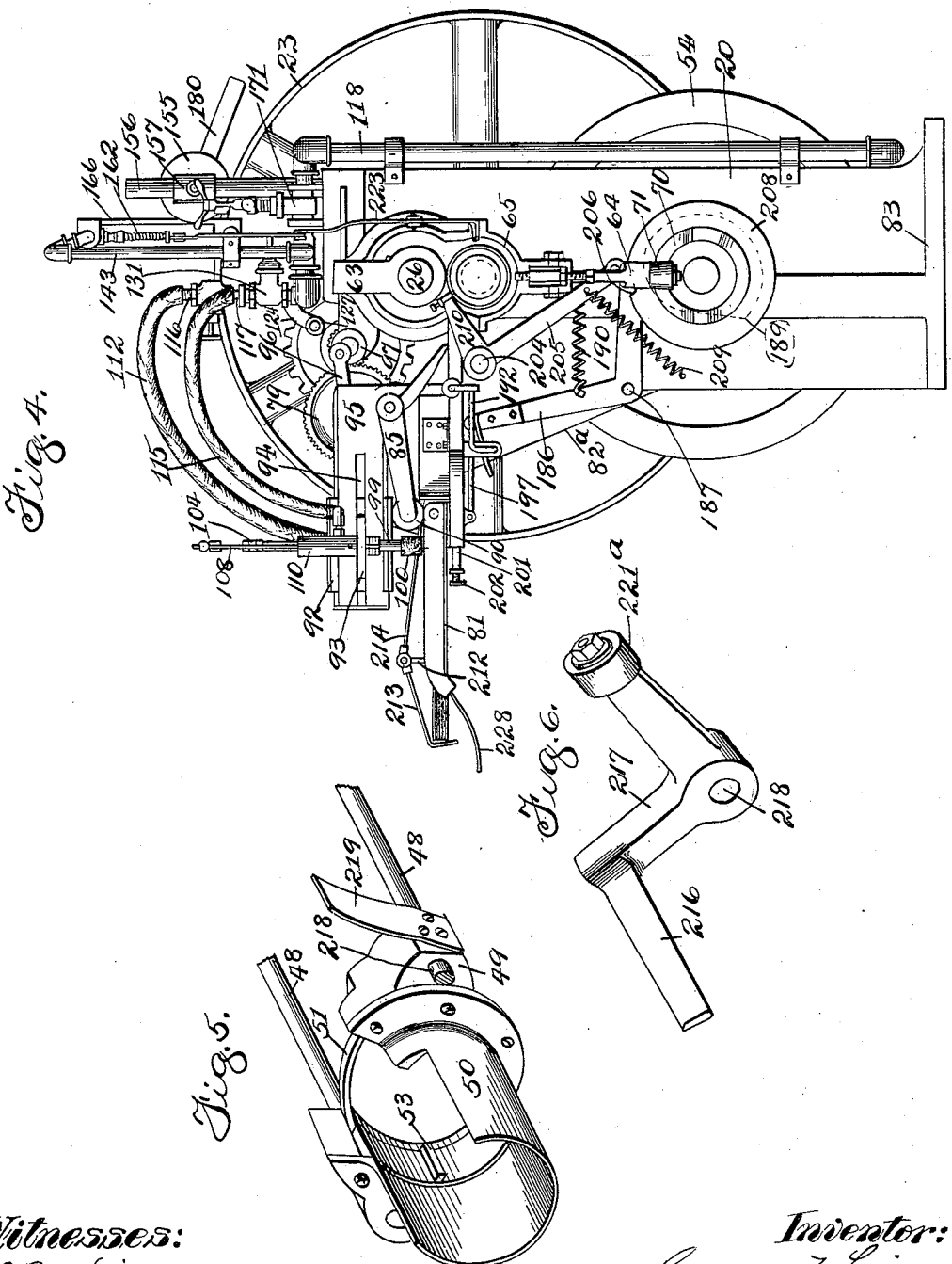

No. 732,004. PATENTED JUNE 23, 1903.
G. F. LEIGER.
MACHINE FOR MAKING CAN BODIES.
APPLICATION FILED NOV. 20, 1902.
NO MODEL. 13 SHEETS—SHEET 5.
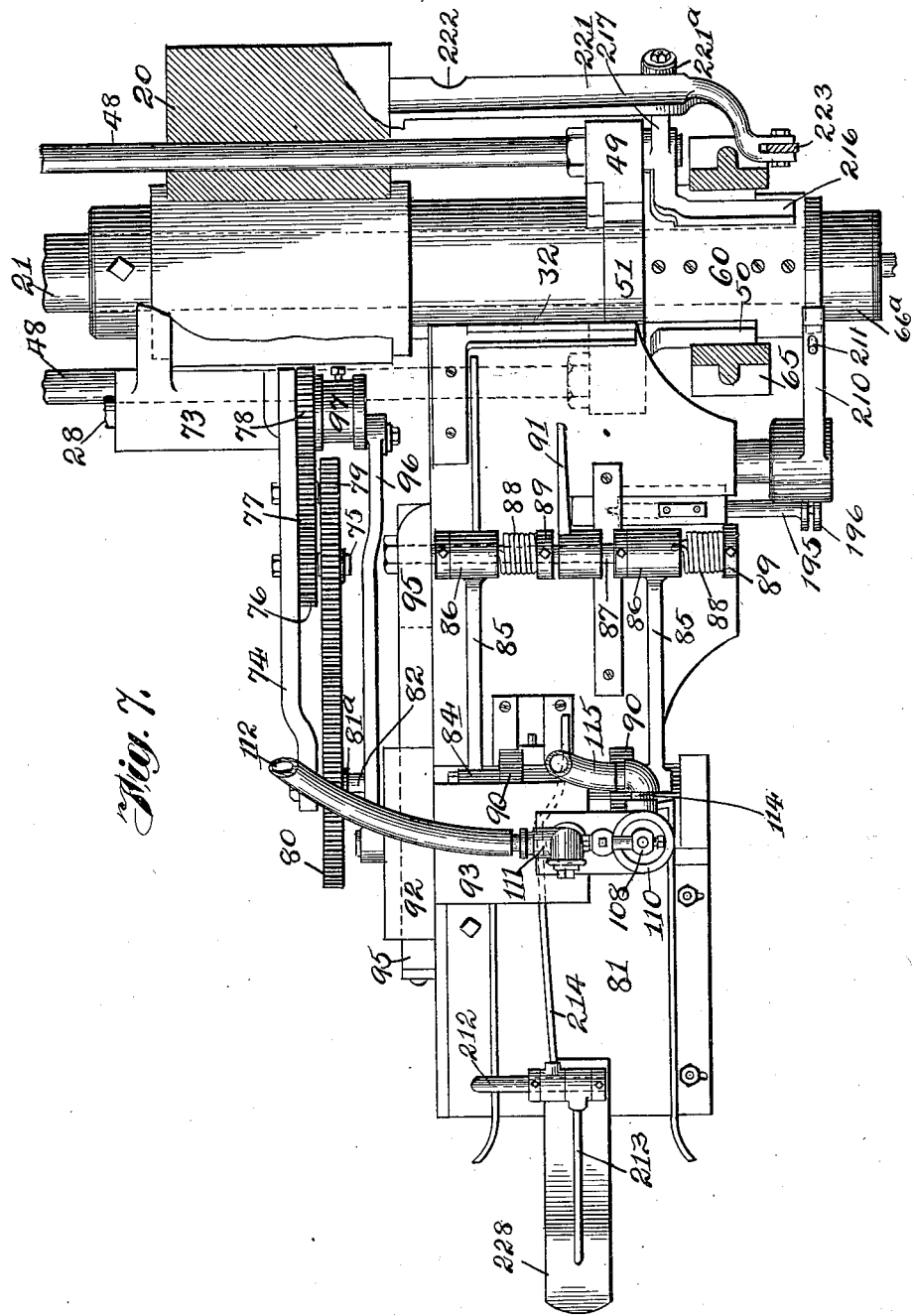
Witnesses:
JB Weir
Ea D. Perry
Inventor:
George F. Leiger
by
Bond, Adams, Pickard & Jackson
Attys

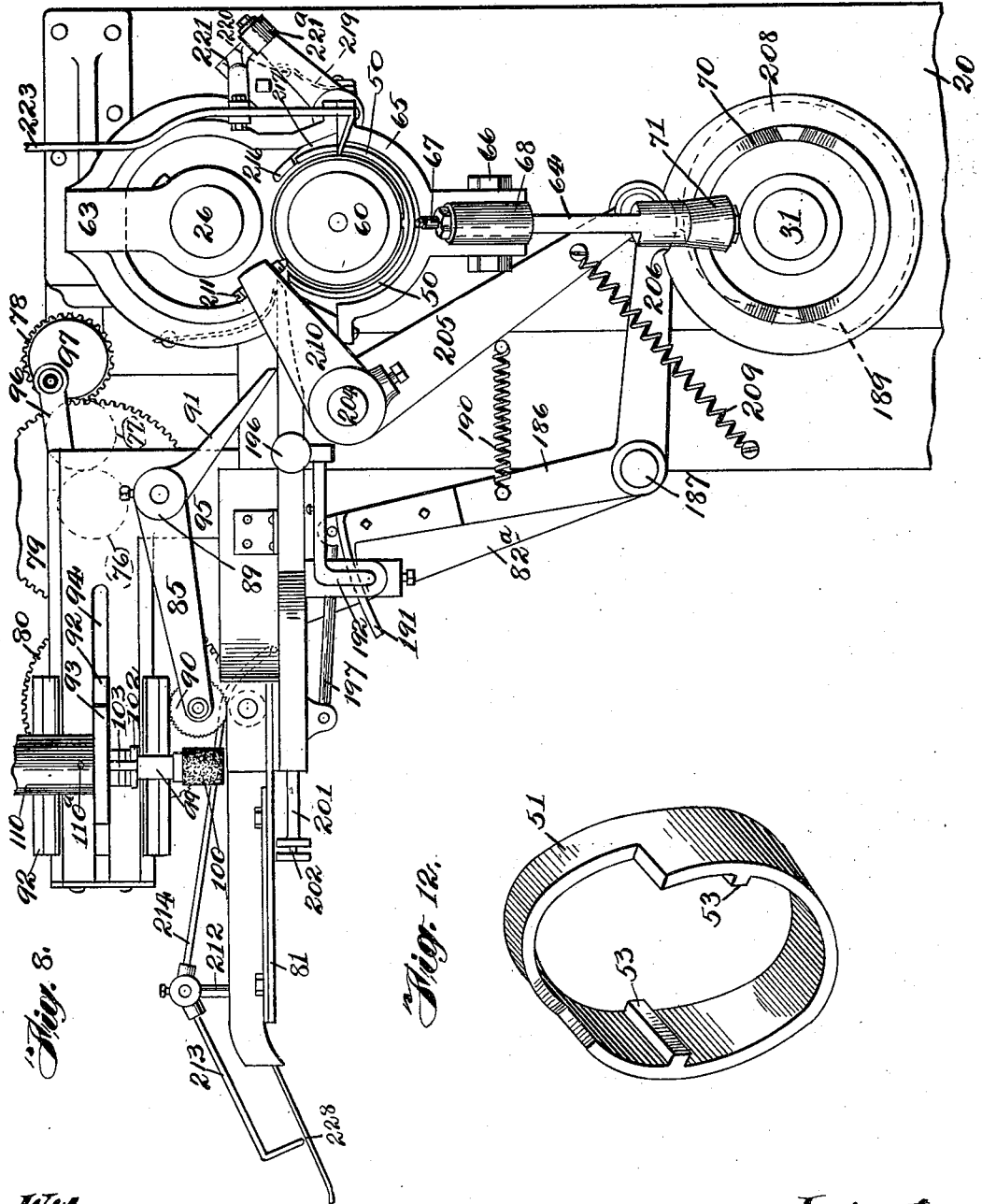

No. 732,004. PATENTED JUNE 23, 1903.
G. F. LEIGER.
MACHINE FOR MAKING CAN BODIES.
APPLICATION FILED NOV. 20, 1902.
NO MODEL. 13 SHEETS—SHEET 7.

Fig. 9.
Fig. 10.
Fig. 11.

Witnesses:
J. B. Weir
Ira D. Perry

Inventor
George F. Leiger
by
Bond, Adams, Pickard & Jackson
Attys

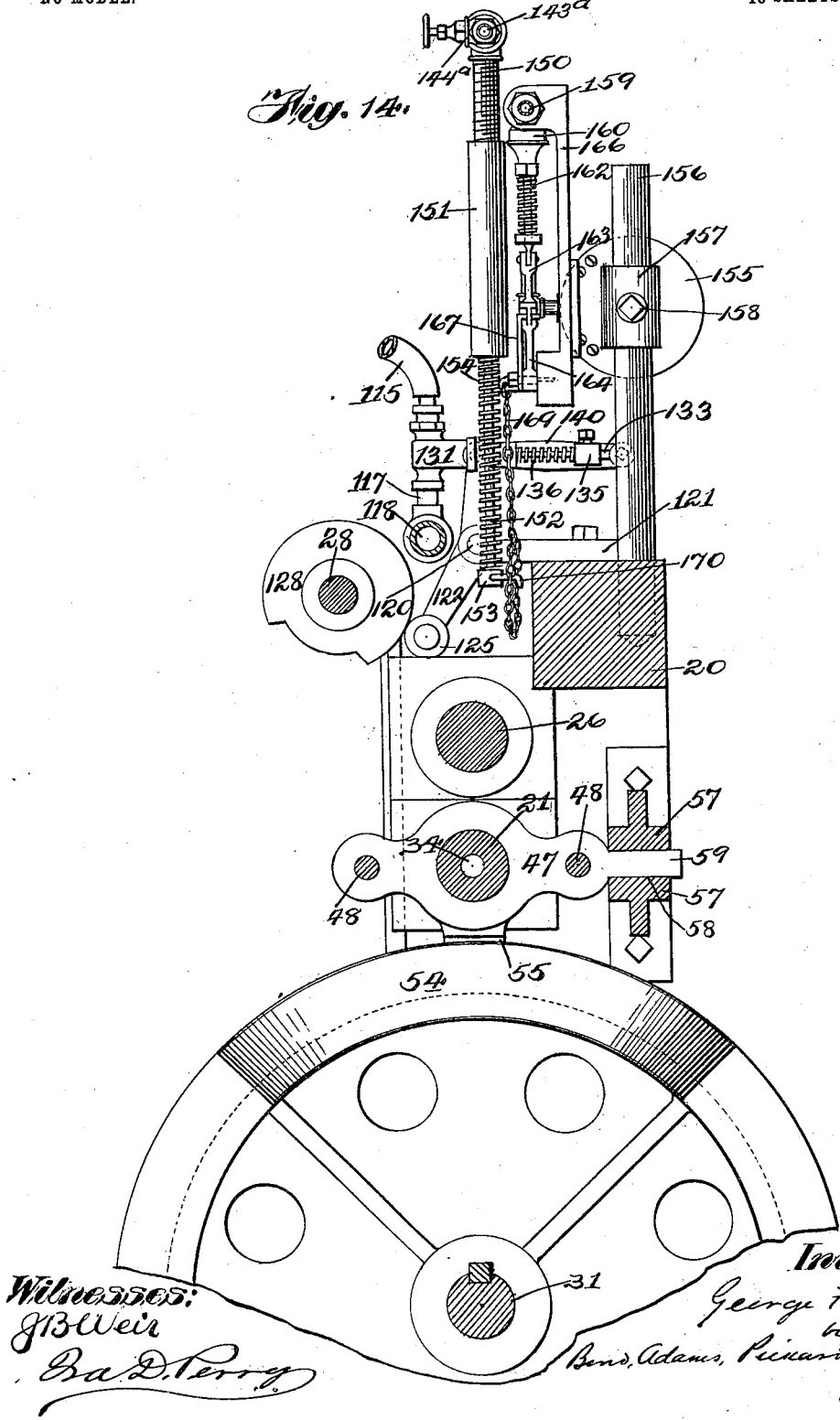

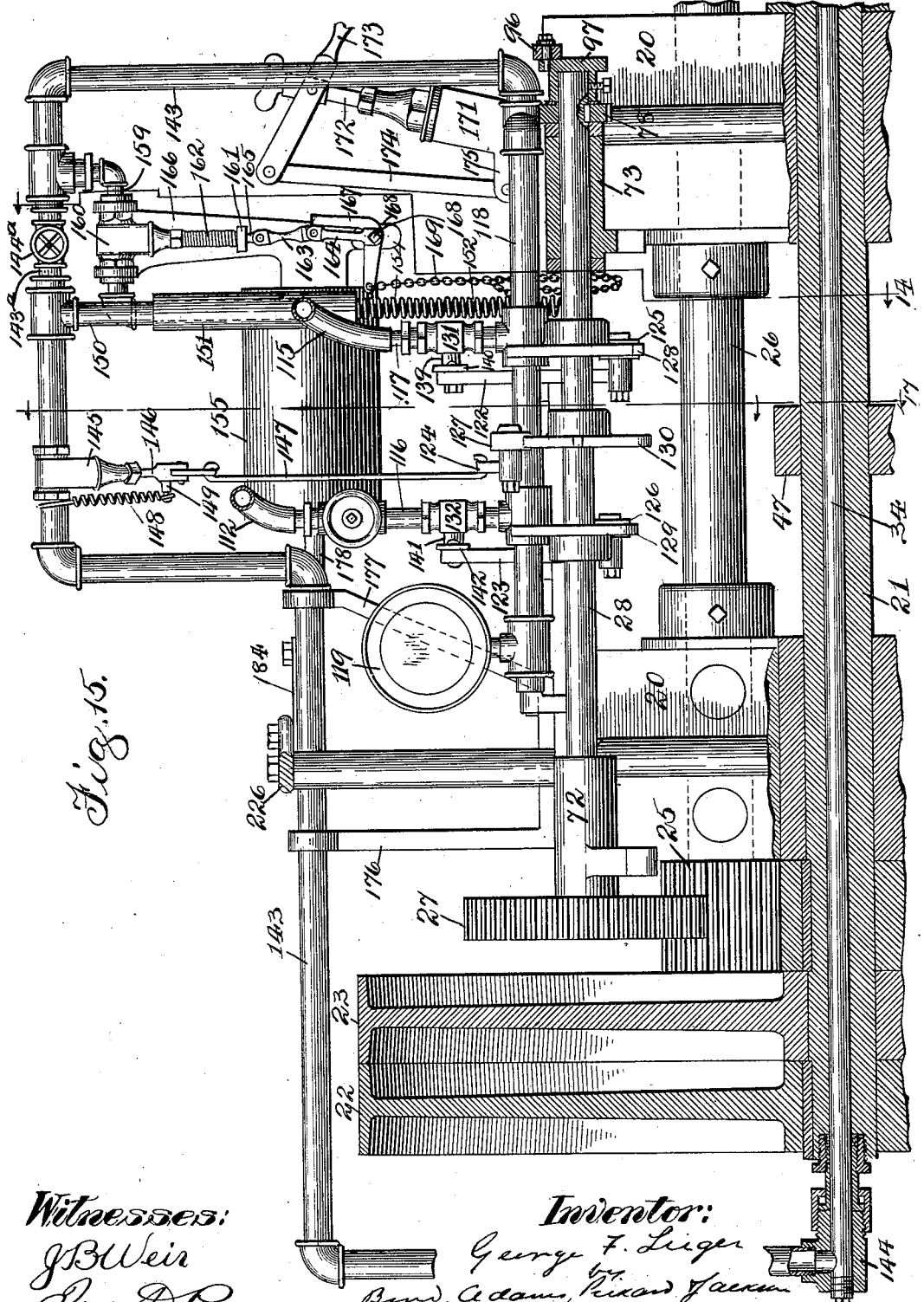

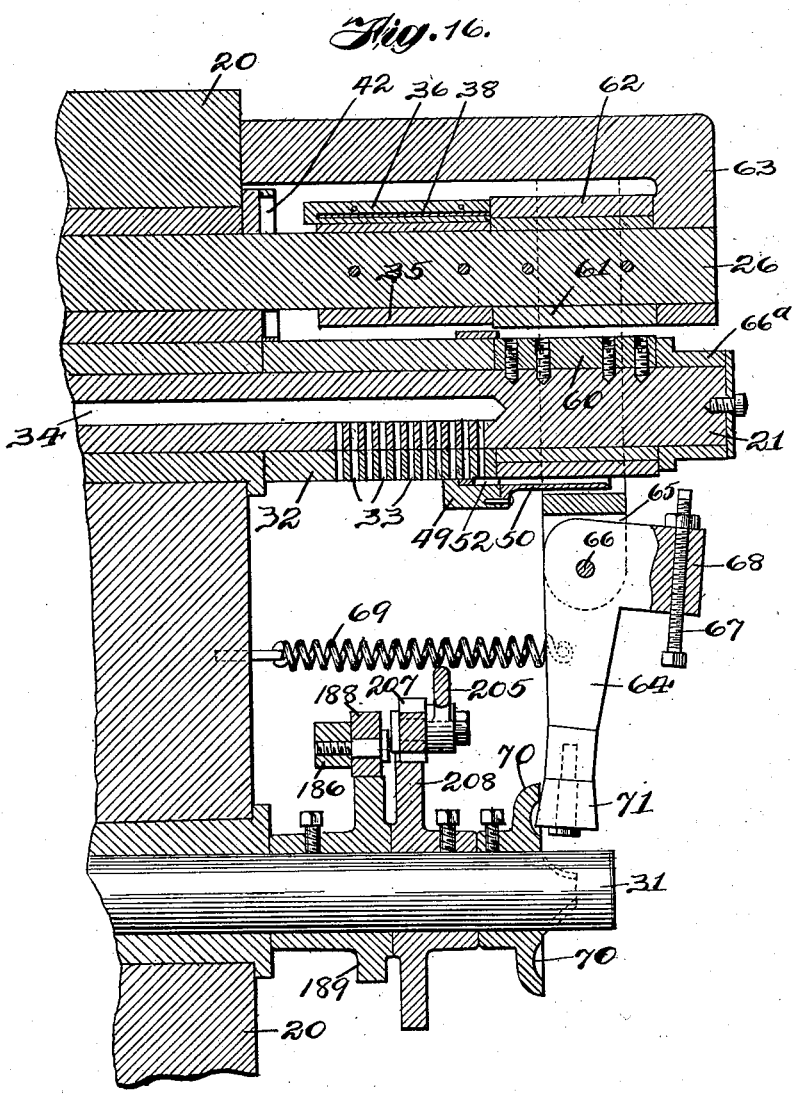

No. 732,004. PATENTED JUNE 23, 1903.
G. F. LEIGER.
MACHINE FOR MAKING CAN BODIES.
APPLICATION FILED NOV. 20, 1902.
NO MODEL. 13 SHEETS—SHEET 12.
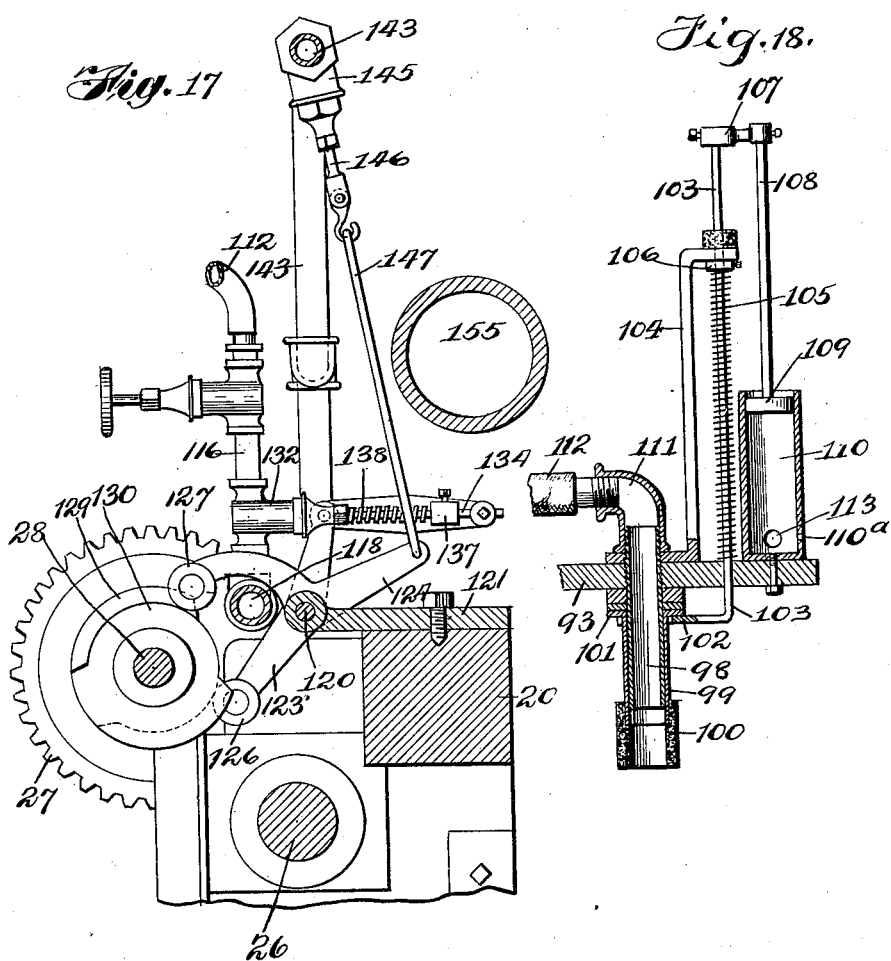

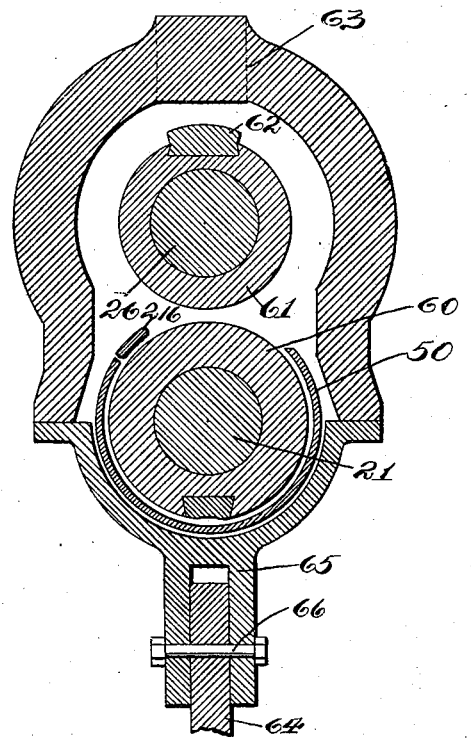

No. 732,004. Patented June 23, 1903.

UNITED STATES PATENT OFFICE.

GEORGE F. LEIGER, OF CHICAGO, ILLINOIS, ASSIGNOR OF THREE-FOURTHS TO LEWIS BENEDICT, OF CHICAGO, ILLINOIS.

MACHINE FOR MAKING CAN-BODIES.

SPECIFICATION forming part of Letters Patent No. 732,004, dated June 23, 1903.

Application filed November 20, 1902. Serial No. 132,064. (No model.)

*To all whom it may concern:*

Be it known that I, GEORGE F. LEIGER, a citizen of the United States of America, residing at Chicago, in the county of Cook and State of Illinois, have invented certain new and useful Improvements in Machines for Making Can-Bodies, of which the following is a specification, reference being had to the accompanying drawings.

My invention relates to machinery for forming sheet-metal cylinders, and is primarily designed for forming cylindrical can-bodies, my invention having particularly to do with various improvements on the machine shown and described in Letters Patent No. 693,325, dated February 11, 1902, granted upon my application. By the means of said Letters Patent cylindrical can-bodies were formed by suitable rolls, whereby the edges of the can-body were bent, interlocked, and then pressed together, so as to be very tightly held, and in that condition afterward delivered from the machine for soldering.

Some of the leading objects of my present invention are to provide pneumatic means for automatically feeding the sheets of metal forward to the forming-rolls; to provide the roll upon which the sheet-metal cylinders are bent around with a chamber having a proper communication with a vacuum-chamber and also having one or more passages leading from the surface of the roll and adapted to be closely covered by the sheet metal in the process of formation into a cylinder, whereby such sheet metal during said process of formation will be assisted in being held closely to the roll; to provide means for suitably cutting off communication between such chamber in the roll and the main vacuum-chamber referred to whenever the passage leading from the surface of the forming-roll is uncovered between the time that a completed cylinder is pushed off from such roll and another sheet is fed thereto; to provide means for destroying the vacuum whenever a sheet of metal is fed so improperly as not to cover the said opening through the surface of the forming-roll or for any reason does not cover such opening at all times when it should cover it during the operation of the machine and by reason of such destruction of the vacuum cause an immediate stoppage of the machine, so that no material, if any, damage can result, as might otherwise be the case if the machine were allowed to run even for a brief period of time with the material in a torn or bent condition.

Another object of the present invention is to provide means for removing or "stripping" the cylindrical sheet-metal body from the forming-roll after its edges have been interlocked, such means comprising a member having a rotary as well as a reciprocating movement, the rotary movement being for the purpose of allowing such member to turn with the rotation of the can-body on the forming-roll, thus avoiding any friction between such member and the end of the can-body, against which it abuts.

It is also the object of my invention to improve the machine as a whole, all as hereinafter fully described. That which I believe to be new will be pointed out in the various claims.

In the accompanying drawings, Figure 1 is a plan view. Fig. 2 is a rear elevation. Fig. 3 is an end elevation taken from the right-hand side of the machine, as shown in Fig. 2, and showing the driving and loose pulleys partly broken away. Fig. 4 is an end elevation taken from the opposite end of the machine to that shown in Fig. 3. Fig. 5 is a detail of a portion of the means employed for removing a formed can-body from the roll on which it is formed. Fig. 6 is a detail of the pressure device that bears against the material of which the can-body is formed during the process of formation of the can-body. Fig. 7 is a detail, being a plan view of the means for feeding the sheets of metal to the forming-rolls and showing also, partly in section, the means for removing or stripping a formed can-body from the forming-roll. Fig. 8 is a detail, being an enlarged view of a portion or the mechanism shown in Fig. 4. Fig. 9 is a plan view of the table on which are placed the sheets of material to be fed to the forming-rolls, the pneumatic feeding devices being omitted. Fig. 10 is a section at line 10 10 of Fig. 9. Fig. 11 is a section at line 11 11 of Fig. 10. Fig. 12 is a detail, being a perspective view of the rotating and reciprocating ring forming a part of the mechanism for removing a formed can-body from the forming-roll. Fig. 13 is a detail, being an enlarged vertical section through the forming-rolls and the devices for removing a formed can-body from the roll over which it is formed, showing also in elevation a portion of the cam attached to the end of the frame by means of which cam the tucking-blade in the upper roll is given the proper movement. Fig. 14 is a vertical section on line 14 of Fig. 15. Fig. 15 is an enlarged detail, partly in section, of the upper part of the machine, from the front thereof, and showing the arrangement of air-pipes and connections. Fig. 16 is a detail, being a vertical section through the forming and seam-pressing rolls and attached parts. Fig. 17 is a section at line 17 of Fig. 15. Fig. 18 is a detail, being a vertical section through the pneumatic picker and devices employed in lifting the same. Fig. 19 is a section taken on line 19 19 of Fig. 16 and looking to the right; and Fig. 20 is a detail, being a plan view of a portion of the reciprocating mechanism that removes the can-body from the forming-roll, that portion of the supporting-framework that is shown being in section.

Referring to said drawings, 20 indicates the main frame of the machine, upon or from which the operative parts are supported.

21 indicates a shaft extending across the machine and suitably journaled in the frame, upon one end of which shaft is keyed a driving-pulley 22, and adjacent thereto is mounted a loose pulley 23. Between the pulley 23 and the side of the framework is a series of gear-wheels through which the various operative parts of the machine are driven, the gear-wheel on the shaft 21 being indicated by 24 and meshing with a similar gear 25 above it on a shaft 26, which in turn meshes with another and larger gear-wheel, 27, on a shaft 28, which shaft 28 extends across the front of the machine above the frame 20. (See Fig. 15.) The gear 24 also meshes with a gear 28$^a$, located below it on the end of a short shaft 29, which gear 28$^a$ in turn meshes with a gear 30 on the end of a long shaft 31, the gears 28$^a$ and 30 being of a size to compel the rotation of the shaft 31 once for every two revolutions of the shaft 21, as explained in my said Patent No. 693,325. On the opposite end of the shaft 21 and a short distance from the frame 20 is securely fastened a roll 32, having through it a series of radial openings 33, registering with similar openings in the shaft 21 and communicating with a longitudinal passage 34 in the center of the shaft 21, said passage being closed at a point about opposite the outer end of the roll 32, (see Fig. 16,) but extending through the opposite end of said shaft, as clearly shown in Fig. 15, at which end the said passage 34 communicates with a pipe connected to a vacuum-chamber, all as hereinafter fully described. 35 indicates another roll secured to the shaft 26 directly opposite the first-mentioned roll 32. This roll 35 is provided with two projections 36 36 on its face extending the length of the roll and between which in a suitable longitudinal recess in the roll 35 is a rock-shaft 37, carrying a projecting blade 38, that is adapted to enter an inclined slot 39 in the face of the roll 32 as the two rolls are rotated together. This slot 39 is formed in said roll 32 at an angle with a tangent to said roller, as fully described in my said former patent. As shown, (see Fig. 13,) said slot 39 is formed in a block that is made separate from and suitably set into the surface of the roll 32, the curvature of the outer face of said block conforming to the curvature of the roll. The roll 32, as shown, is somewhat longer than the opposing roll 35, the outer ends of these two rolls being, as shown in Fig. 16, in the same vertical plane and the roll 35 being practically the same width as the width of the material fed between the rolls from which the can-body is to be formed. The rock-shaft 37 projects beyond the inner end of the roll 35 and is rigidly secured at its said projecting end to an arm 40, upon the free end of which arm 40 is mounted a roller 41, adapted to bear against the cam 42, secured to the frame 20 opposite the said roller 35, the cam 42 being secured by two screws 43 44, the latter one of which passes through a short slot 45, whereby the cam as a whole can be adjusted in order to so time the operation of the rolls as to produce perfect work in the forming of the interlocking joint.

46 indicates a block formed with the cam 40 and suitably placed to properly guide the roller 41, so as to compel the turning of the rock-shaft at the proper time to compel it to properly enter the inclined slot 39 in the roll 32.

Referring now to the mechanism whereby the can-body that has been formed on the lower roll 32 is removed therefrom, so as to have its interlocked edges suitably compressed to form a tight joint, 47 indicates a cross-head secured to the shaft 21, so as to slide freely thereon, and having affixed thereto, at opposite sides, bars 48 48, each of which, as shown, pass through that portion of the framework near the forming-rolls, and have secured at their forward ends a head 49, which partially encircles the forming-roll 32. 50 indicates a semicylindrical shell bolted or otherwise secured to the head 49 and partially surrounding the said roll 32, and space being left between such shell and the surface of the roll 32 sufficient to accommodate the sheet metal from which the can-body is to be formed. 51 indicates a ring fitting closely around the said roll 32 and lying in an annular recess 52, formed in the said head 49, as shown in Fig. 16, the ring being thus held so as to be moved with the head 49 when the same is reciprocated back and forth on the roll 32. The ring 51 is provided with one or more projections 53 on its inner face, which enter correspondingly-shaped longitudinal grooves in the face of the roll 32, so that such ring is compelled to rotate with the rotation of such roll 32. It will therefore be seen that this ring has both a reciprocating motion with the non-rotating head 49 and a rotating movement with the roll 32. As best shown in Fig. 5, this ring 51 is materially narrowed for a short distance, which is for the purpose of allowing proper clearance for the arm 40, carried by the rock-shaft 37. The reciprocation of the cross-head 47 is accomplished by the action of a large cam-wheel 54, mounted on the shaft 31, which is engaged by the lower end of a downwardly-projecting arm 55, secured to the center of such cross-head 47, which projects into a deep cam-slot in the face of said cam-wheel 54, the end of said downwardly-projecting arm 55 being preferably provided with an antifriction-roller 56, which bears against the side walls of the slot in the face of the wheel 54. While the bars 48 48, attached to the cross-head 47, pass through and are guided by one side of the frame 20, yet to insure perfect smoothness in operation I have provided an additional guide consisting of two heavy plates 57 57, extending from one side to the other of the framework of the machine and at the rear side of the machine, which are spaced a distance apart, so as to leave a slot 58 between them, into which projects an arm 59, preferably formed integral with the cross-head 47.

It will be evident that as the cross-head is moved forward by the action of the cam-wheel 54 the head 49, which is attached to said cross-head by means of the two bars 48, will likewise be moved, and the partially-completed can-body on the roll 32 will be contacted by the outer edge of the ring 51 and the can-body pushed from such roll 32, the ring 51 of course traveling with the head 49 by reason of being locked to it, as heretofore explained; but as such ring 51 also turns with the roll 32, and consequently with the can-body thereon, there will be no friction between the edge of the can-body and the edge of the ring, which is highly desirable, as such construction eliminates any danger of the can-body being in any way twisted or distorted, as might possibly be the case if the pushing apparatus—that is to say, the ring 51—were non-rotary while the can-body was rotating. While the ring 51 is materially narrower at one portion of its periphery, yet it will be seen that the cutting away of the ring in order to provide this narrow portion is not of sufficient extent to prevent the said ring from contacting with the edge of the can-body for the greater portion of the circumference of the can-body's edge.

When the devices after removing or stripping the partially-completed can-body from the roll 32 are moved to their extreme outer limit, it will be noted (see Fig. 16) that the outer edge of the ring 51 projects slightly beyond the outer edge of the roll 32, thus insuring such can-body being entirely removed from such roll, so that it cannot in any manner interfere with the placing of another sheet of metal on and around such roll. The partially-completed can-body as it is pushed from the roll 32 passes upon another roll 60 of the same diameter as roll 32, which roll is secured in any suitable manner to the shaft 21 so as to turn therewith. Immediately above this roll 60 is suitably secured another roll 61 on the shaft 26, which roll 61 has secured to it a longitudinal bar 62, which may be termed a "seam-presser," as it is so located as that when the rolls are rotated such bar 62 will be brought directly over the interlocked seam of the can-body that is then upon the roll 60 and bear with sufficient force, as fully set forth in my said Letters Patent, to press said interlocked seam. To properly support the shaft 26, I provide an arm 63, suitably bolted to one side of the frame 20 and having its outer end bent downward, in which downward-bent end the outer end of the shaft 26 is suitably journaled. It is important to apply an upward-supporting pressure to the projecting end of the shaft 21, on which the rollers 32 and 60 are secured during the operation of pressing the interlocked seam of the can, and this is accomplished in the construction shown by providing a pivoted bell-crank lever 64, that is pivotally supported on a short shaft 66 at the lower end of a frame 65, that is preferably formed with the arm 63. In the short arm of this lever 64 is a contact device adapted to be swung up and pressed against a ring 66$^a$, which fits over and is suitably held upon the projecting end of the shaft 21, the contact device in the construction shown being in the form of a heavy screw 67, which is screw-threaded into a suitable socket 68, formed on the outer end of the short arm of the bell-crank lever, and thereby the contact device may be adjusted so as to regulate the amount of pressure to be applied to the under side of the said shaft 21. The bell-crank lever 64 is normally held back by a coiled spring 69, so that the contact device 67 is away from the end of the shaft 21; but at the proper period of time when the supporting pressure is required such contact device is forced up against the ring 66$^a$ by means of a cam-wheel 70, secured to the shaft 31, against the face of which an antifriction-roller 71 at the lower end of the long arm of said bell-crank lever bears, the cam-wheel 70 being so shaped and its movements so timed, of course, as to raise the contact-piece 67 and force it against said shaft 21 just as the seam-presser 62 is brought to bear on the interlocked seam of the can-body. The ring 66$^a$ is so attached to the shaft 21 that when contacted by the screw 67 it will remain stationary.

Referring now to the mechanism for automatically feeding pieces of sheet metal to the rolls to be formed into cylindrical bodies, it will be noted that the shaft 28 referred to is at the front of the machine and is suitably journaled in bearings 72 73, which are secured, respectively, at opposite sides of the frame 20 and near the upper forward corners thereof. This shaft 28 is driven, as before explained, from the large gear-wheel 27, fastened upon one end of said shaft, which gear-wheel is forward of and somewhat above the gear-wheel 25, with which it meshes. (See Fig. 15.) Projecting from one end of the bearing 73 is a rigid arm 74, which is supported by a brace 74$^a$. 75 is a short stub-shaft secured in said arm, upon which is mounted immediately next to the inner face of said arm 74 a pinion 76, that meshes with a similar-sized pinion 77, mounted upon a short axle secured to the arm 74, which in turn meshes with another pinion 78, secured upon the shaft 28. Upon the projecting end of the stub-shaft 75 is mounted a gear-wheel 79, which meshes with another gear-wheel 80, that is suitably journaled on a short stub-shaft passing through the arm 74, near the end thereof. This latter gear-wheel 80 meshes with a small pinion 81$^a$, secured near the outer end of a shaft 82.

81 indicates a table or support upon which the sheet-metal plates of the required size are placed and from which they are successively picked up, as hereinafter described, to be fed forward into the cylinder-forming rolls heretofore referred to. The table is supported by a bracket 82$^a$, suitably bolted to the machine, but which of course could be otherwise secured in place. The shaft 82 extends across the table 81 and has on it a roughened or milled roller 84, over which the sheets of material are fed.

85 85 indicate arms, each provided at its rear end with a hub portion 86 and each hub portion being pivotally secured to a shaft 87, projecting out over the feed-table, said shaft being secured at one end to an angular-shaped bracket 95, that rises alongside of the feed-table and is bolted or otherwise secured to the support 82$^a$. The shaft 87 does not revolve. Wrapped around the shaft 87 are two coiled springs 88, each having one end secured in a fixed collar 89 and having its other end secured in one of the heads, the action of such springs tending to normally hold the outer ends of the arms 85 downward. Each arm 85 has at its outer end a short journal passing through it, on which is loosely mounted a roller 90, these rollers being preferably roughened or milled on their surfaces and bearing against the roughened or milled roller 84. Between the two hubs 86 86 of the arms 85 is mounted on the shaft 87 a finger 91, extending in the opposite direction from the said arms 85 85 and which is capable of being adjusted on such shaft so as to have its outer end moved farther from or closer to the surface of the feed-table. This finger is designed to have its outer end just far enough removed from the surface of the table to permit a single sheet of metal that is to be fed to the rolls to pass thereunder.

92 indicates a slide adapted to fit over and upon the horizontal portion of the angular-shaped bracket 95 and carrying a horizontal plate 93, that extends over the feed-table 81. This horizontal plate 93 extends through a slot 94 in said angular-shaped bracket 95, as clearly shown in Fig. 8. The slide 92 and its horizontal plate 93 are reciprocated through a bar 96, pivotally connected at one end to the outer face of the slide and eccentrically attached at the other end in the construction shown to the face of a cap 97, placed over the end of the shaft 28 and bolted thereto.

98 indicates a short section of metal pipe passing through and suitably secured in the horizontal plate 93, around which and movable thereon is a hollow stem 99, provided at its lower end with a hollow elastic cylinder 100, which in view of its function hereinafter described may be denominated a "picker" or "picker-head." The upper end of the surrounding hollow stem 99 is provided with a head 101, which is adapted to be engaged by a fork 102 at the turned end of a rod 103, which passes through a suitable opening in the plate 93 and is supported at its upper portion by an eye formed in the turned end of a rod 104, which is secured to the horizontal plate 93.

105 indicates an easily-compressible coiled spring, which bears at one end against the plate 93 and at the other end against a collar 106, secured to the rod 103 and normally tends to hold such rod 103 in its raised position. Attached to the rod 103 by any suitable means—such, for example, as that shown in Fig. 18 and indicated by 107—is a piston-rod 108, to the lower end of which is secured an ordinary piston-head 109, that is movable within a small cylinder 110, that is suitably supported near the outer end of the horizontal plate 93.

111 indicates an elbow secured to the upper end of the pipe 98, to which is adapted to be secured a suitable flexible hollow tube 112.

113 indicates an opening near the bottom of the cylinder, into which projects a metal tube 114, to which is adapted to be secured a flexible tube 115, similar to the flexible tube 112, before referred to. These flexible tubes 112 and 115 are connected at their opposite ends to short sections of pipe 116 117, respectively, each of such short sections of pipe 116 117 communicating with a main air-pipe 118, which is closed at one end, at which end is located a pressure-gage 119. (See Fig. 15.) The other end of this pipe leads to a suitable vacuum-chamber, indicated by 119$^a$, (see Fig. 2,) and which may be located at any desired place in the building where the machine is in use.

120 indicates a short shaft immediately in the rear of that portion of the main air-pipe 118, that carries the short vertical sections of pipe 116 117, said short shaft 120 being mounted in bearings at the forward edge of a plate 121, that is bolted to the top of the cross-bar of the frame 20. To this short shaft 120 are pivotally attached three levers, one at each end of the shaft and one in the center thereof, the end levers being numbered, respectively, 122 and 123 and the middle lever being indicated by 124. At the forward end of the lever 122 is carried an antifriction-roller 125, and at the forward end of the lever 123 is a similar antifriction-roller 126, and at the forward end of the middle lever 124 is also an antifriction-roller, (indicated by 127,) each of these rollers being loosely mounted on short lateral axles journaled in the ends of the respective levers.

128, 129, and 130 indicate cams keyed or otherwise firmly secured upon the shaft 28, against the faces of which cams the rollers 125, 126, and 127 respectively bear.

131 indicates a valve-casing in the pipe 117, and 132 indicates a similar valve-casing in the pipe 116, from the valves in which casings respectively project toward the rear of the machine valve-stems 133 and 134, the valve-stem 133 having fixedly secured to it a collar 135.

136 indicates a coiled spring secured around the valve-stem 133 and bearing at one end against the collar 135 and at its other end against a nut at the end of the valve-casing. The valve-stem 134 is similarly equipped, the collar thereon being indicated by 137 and the coiled spring by 138.

139 indicates a short arm fixedly attached to the outer end of the valve-stem 133 and projecting at right angles therefrom, to which is attached a bar 140, that is pivotally connected at its inner end to one end of the lever 122. 141 is a similar arm connected to the outer end of the valve-stem 134 and extending at right angles thereto, to which is attached a bar 141, that is pivotally connected at its other end to one end of the lever 123.

It will be evident, from the foregoing, that upon the rotation of the shaft 28 the various cams thereon will rotate with such shaft, and through the action of the cams 128 and 129 the levers 122 and 123 will through their several connections act at regular intervals to open the valves in the casings 131 and 132, and owing to a vacuum being maintained in the main pipe 118 by reason of its connection with the vacuum-chamber, as stated, a vacuum will be from time to time temporarily established in the flexible pipes 112 and 115, and such vacuum will as regularly be broken in such flexible pipes by the turning of the said cams 128 and 129 to such positions as will compel the closing of the said valves, it being understood, of course, that the cams are shaped and the parts so timed as to create and destroy the vacuum in the flexible tubes at the proper times.

143 indicates an air-pipe made up of sections united by suitable elbows and other connections and having communication at one end through a suitable connection 144 with the passage 34 in the shaft 21, as shown. This pipe 143 extends up alongside of the pulley 22 and across and over the machine and down opposite that portion of the main pipe 118 that lies immediately above the upper surface of the frame 20, where its end is connected to such pipe by a suitable union.

145 indicates a valve-casing in one portion of the pipe 143, in which is a suitable valve to which is attached a stem 146, said stem being connected through a link 147 with the rear end of the lever 124.

148 indicates a coiled spring attached at one end to the pipe 143 adjacent to the valve-casing 145 and attached at its other end to an arm 149, projecting laterally from the valve-stem 146, the tendency of this spring being to normally hold the valve closed across the pipe 143.

150 indicates a downwardly-projecting nipple communicating with the interior of the pipe 143 and having communication at its lower end with a small cylinder 151, which is secured to such nipple 150. Within this cylinder is a piston-head movable therein, to the lower side of which is attached a piston-rod 152, having clamped near its lower end a collar 153, between which collar and the lower end of the cylinder 151 is a coiled spring 154.

155 indicates an air-cylinder supported on a standard 156, extending up from the frame of the machine, around which standard passes a sleeve 157, that is bolted to the rear end of the cylinder, and through which cylinder passes a set-screw or bolt 158, by which the cylinder is secured in place on the standard.

159 indicates a short section of pipe communicating at one end with the pipe 143 and communicating at its other end with the rear end of the cylinder 155.

160 indicates a valve-casing in which is located a valve adapted to cut off communication between the pipe 143 and the cylinder 155, said valve being provided with a downwardly-extending stem 165, near the lower end of which is fixed a collar 161, between which and the lower end of the casing 160 is a coiled spring 162.

163 indicates the upper member, and 164 the lower member, of a pair of toggle-levers suitably pivoted together, the upper end of the toggle-lever 163 being pivoted to the end of the valve-stem 165, and the lower end of the toggle-lever 164 being pivoted near the lower end of a bracket 166, that is secured in the construction shown to the rear end of the cylinder 155 and also to the rear side of the valve-casing 160.

167 indicates a bell-crank lever pivoted at 168 on the same pivot to which the lower end of the toggle-lever 164 is secured. The turned upper end of this bell-crank lever 167 comes opposite and is adapted to bear against the toggle-levers where they are pivoted together.

To the other end of the said bell-crank lever is attached one end of a flexible connection—as, for example, a chain 169, the other end of said chain being looped and adapted to be engaged by a hook or projection 170, carried by the collar 153 on the lower end of the piston-rod 152.

171 indicates a valve-casing located in the construction shown in that portion of the main pipe 118 that lies immediately above the frame of the machine and extending from the front to the rear thereof, in which valve-casing is a valve adapted to be moved across the pipe to cut off communication therefrom, said valve-casing being provided with a stem 172, to which stem is pivoted a handle-bar 173, having pivotal connection at its rear end with a rod 174, that is pivoted at its lower end through a projection 175 on the valve-casing. By means of this device the main pipe can be closed by hand at this point whenever it is desired to cut off all communication of the pipe 118 and pipes connected therewith from the action of the vacuum-chamber, to which, as before stated, this pipe 118 leads.

176 177 are braces secured to the frame of the machine and provided to assist in supporting the pipe 143 in proper position above the frame of the machine.

178 indicates a piston-rod connected with a piston that fits and moves within the cylinder 155, said piston-rod being guided in the upper end of a suitable support 179, attached to the frame of the machine at one end thereof. Beyond said support 177 and near the outer end of said piston-rod 178 are attached two arms 180, projecting out from a head 181, said devices 180 181 forming means for engaging a belt passing over either of the pulleys 22 23 and adapted upon the reciprocation of the rod 178 to shift such belt from one pulley to the other, accordingly as the machine is to be operated or stopped.

182 indicates a lever pivotally attached at 183 to the rear side of the frame of the machine and at its upper end pivotally attached to one end of a link 184, the other end of which link is pivotally connected with the rod 178.

185 indicates a brake carried by the lever 182 near its lower end and adapted to be forced against the side of the cam-wheel 54 when the rod 178 is moved into the cylinder 155.

186 indicates a bell-crank lever pivotally attached at 187 to the frame of the machine below the feed-table 81 and having its rear end provided with a roller 188, that runs upon the periphery of a cam 189, secured upon the shaft 31 just outside of the frame 20. This roller 188 is held in engagement with the periphery of such cam by a coiled spring 190, secured to such bell-crank lever 186 and also to the frame of the machine. The opposite end of the bell-crank lever is provided with a forwardly-projecting plate 191, which, as shown in Fig. 11, is inclined backwardly and also, as shown in Fig. 10, downwardly.

192 indicates a rod, one end of which passes through and has a bearing in the support 82ª of the framework, said rod being located below the feed-table 81 and near the right-hand edge thereof being bent up to lie close to such feed-table, as shown in Fig. 8, and being again bent and continued to near the inner end of the feed-table, where it is attached to a depending portion of a movable guide 193, that projects through a transverse slot 194 in such feed-table, said movable guide being held in grooves cut in the feed-table at each side of the slot 194, as indicated by the dotted lines in Fig. 9. This movable guide 193 projects slightly above the surface of the feed-table. The guide proper, 193, consists of a block screwed or otherwise fastened to the face of a sliding plate 194ª, and to this plate is attached a hollow stem 195, which projects beyond the edge of the table 81 and has passing through it a screw-threaded shank 196, the end of which is adapted to contact with the end of the slot 194, thus forming a limit-stop for the guide as a whole. By means of this screw-threaded shank the amount of movement of the guide can be regulated, as required. 197 indicates another rod attached to the upper end of the bell-crank lever 186 and projecting toward the front of the machine beneath the feed-table 81 and attached at its forward end to the depending portion of a guide that is adapted to reciprocate longitudinally of the table 81. This last-named guide is similar to the one heretofore described, and consists of a block 198, attached to a plate 199, that moves in suitable ways in the sides of a slot 200, formed in the surface of the feed-table. This plate 199 is provided with a hollow stem 201, through which passes a screw-threaded shank 202, whose end is adapted to contact the end of the slot 200, and thereby provide a positive stop for the movement of the last-named guide.

203 indicates an antifriction-roller pivotally attached to the rod 192, against which the inclined edge of the plate 191 is adapted to bear.

204 indicates a short shaft journaled at one end in the frame of the machine, projecting outward therefrom and having keyed to it one end of an arm 205, said arm 205 being provided on its lower end with an antifriction-roller 207, that bears against the edge of a disk 208, that is fixed upon the shaft 31 between the cams 70 and 189, such disk being provided with a semicircular notch 206, into which during every revolution of the said disk the antifriction-roller 207 is adapted to drop. 209 indicates a coiled spring secured at one end to said arm 205 and at its other end to the frame of the machine and acting to hold the antifriction-roller 207 constantly in contact with the disk 208. 210 indicates an arm fixedly secured to the outer end of said shaft 204 and provided at its outer end with a contact-piece 211, which in the form of construction shown is a screw, so that said contact-piece may be adjusted as required.

The outer end of this arm 210 projects toward the roll 60, and the contact-piece is adapted to be brought forcibly and quickly down upon the can-body on such roll, this being accomplished by the dropping of the antifriction-roller 207 into the notch 206, which causes the shaft 204 to turn sufficiently to carry down the short arm 210. The object of this construction is to insure the can-body being stopped, so that it will be delivered from such roll with its interlocked and pressed seam in proper position to be fed correctly to a soldering-machine, and thereby insure the solder being applied properly to the joint, it being understood that, as hereinbefore suggested, I have found it practicable and advisable to use in connection with this invention an automatic can-soldering machine to which the can-body is directly fed after having the seams interlocked and pressed, as herein described.

212 indicates a support attached at one side of the feed-table 81, near the outer end thereof, to the horizontally-turned end of which are loosely attached two rods 213 214, each of said rods having their outer ends downwardly turned. The rear rod 213 bears against the rear ends of the pile of sheet-metal blanks placed upon the table 81, as shown in Fig. 3, and the forward rod, as will be seen by reference to Fig. 8, extends past the corrugated roller 84, and such forward end is raised as a sheet of metal is passed over such corrugated roller and acts so as to cause the rear end of such sheet of metal to immediately drop upon the table in front of said corrugated roller after it has passed over such roller.

215 indicates a series of holes through the bed of the feeding-table, which are for the purpose of preventing the last sheet of the pile from "sucking" or sticking to the feed-table when it is attempted to be raised by the picker-head 100.

In addition to holding the sheet of metal on the roller 32 by suction through the openings 33 I provide an arm 216, which is formed with or rigidly attached to a bell-crank lever 217, that is pivotally attached at 218 to one side of the head 49. Said arm 216 lies parallel with the roll 32 and is held tightly against the can-body that is being formed thereon by a flat spring 219, attached to the head 49 and bearing against a laterally-projecting pin 220 on the bell-crank lever 217.

221 indicates a bar secured at its inner end to the side of the frame 20, against the edge of which bar an antifriction-roller 221$^a$ bears, said antifriction-roller resting in a semicircular notch 222 during the time that the can-body is being formed on the roll 32, such notch in the bar 221 being of sufficient depth to allow the arm 216 to bear against the can-body being formed, and so compel the material to be kept smoothly and closely to such roller. It is necessary, of course, that the pressure of this bar be removed when it is desired to force the can-body from such roll 32, and this is accomplished by the bell-crank lever 217 being moved with the head 49, and as such movement takes place the antifriction-roller 221$^a$ passes out of its notch 222 and moves along the straight edge of the bar 221, and it will be evident that immediately upon the roller passing from the notch the arm 216 is lifted away from engagement with the can-body. The parts are so timed that after the can-body has been removed from this roll another sheet of metal will have been fed to the roll and partly in position thereon by the time that the antifriction-roller 221$^a$ is again forced into its notch 222 by the action of the spring 219. This bar 221 has pivoted at its forward end a lever 223, to the forward end of which is pivotally attached a rod 224, that passes through an opening in a clip 225 around the pipe 143. This rod 224 has its free end about opposite the connecting-joint of the toggle-levers 163 164 and is adapted to act upon such toggle-levers in the same manner as the bell-crank lever 167 in case a defectively-constructed can-body should be forced forward on the roll 60. The lower end of the lever 223 is inturned, so as to lie close enough to the said roll 60 to permit a properly-made can to pass between it and such roll; but in case the seam of the can should not be properly formed, so as to allow the can-body to spread, this inturned end of the lever 223 would be contacted and the lever turned and through the rod 224 the toggle-levers 163 164 would be broken at their joint.

226 indicates a pivoted lever, one end of which is suitably attached to the rod 178, and by means of which lever the rod and its attached piston can be forced by hand back into the cylinder 155, thus shifting the driving-belt from the fast to the loose pulley.

When the machine is in operation, the shaft 28 at the front of the machine by its rotation sets in motion the train of gears through which the shaft 82, carrying the roughened or corrugated feed-roller 84, is driven, and at the same time the slide 92 will be reciprocated, carrying with it the picker-head 100 and attached parts that are secured in or supported upon the horizontal plate 93. When such slide has about reached the limit of its motion toward the front of the machine, the cam 128 on said shaft 28 will act upon the lever 122, causing the valve in the casing 131 to be opened, thereby putting the flexible tube 115, that communicates with the cylinder 110, into communication with the main vacuum-pipe 118, the effect of which will be to instantly exhaust the air from such flexible tube 115 and from such small cylinder 110, with the result that the pressure of the atmosphere on the upper side of the piston-head 109 in such cylinder 110 will force such cylinder-head down, carrying with it, of course, the attached rod 103, the comparatively light spring 105 around such rod 103 being compressed. Inasmuch as the telescopic pipe 99, that carries the picker-head 100, is held up by the fork 102 on the rod 103, such telescopic tube and picker-head 100 will drop by gravity, and as the picker-head 100 strikes the top sheet of the pile of material that is laid upon the table 81 the cam 129 will act upon its lever 123, causing the valve in the casing 132 to be opened, thus affording communication with the main air-pipe 118 through the short pipe 116, flexible tube 112, and telescopic tube 99 and hollow picker-head 100. A powerful suction is thus immediately established, which causes the sheet of metal upon which the picker-head rests to adhere to such picker-head. As this is accomplished the cam 128 acts to close the valve in the casing 131, and the piston 109 immediately commences to rise, owing to the admission of air through a small air-hole $110^a$ near the bottom of the cylinder 110. The parts attached to the piston-rod 108 also rise with it, being assisted by the spring 105, and the sheet of material adhering to the picker-head 100 is also raised and is carried forward with the forward movement of the slide 92 and its attached plate 93, causing the forward edge of such plate to enter between the roll 84 and the two pressure-wheels 90, that are carried on the ends of the arms 85. As soon as this is accomplished the cam 129 acts to close the valve in the casing 132, thus cutting off communication between the pipes leading to the picker-head 100 and the main pipe 118. The continued rotation of the roughened roller 84 causes the sheet to be fed forward until it drops flat upon that portion of the table forward of the roller, being assisted to settle evenly down upon such table by the forward end of the arm 214 bearing upon it. As the rear end of the sheet settles into place, it is guided between the two rolls 32 and 35, where the operation of forming the interlocking seam is performed, as set forth in my said former patent. The parts are so timed that as the sheet of metal covers the series of openings 33, that extend through the roll 32 and its axle 21 and communicate with the central passage 34 of such axle, the cam 130 acts upon the lever 124 to open the valve in the casing 145, such casing being, as heretofore stated, in the raised part of the pipe 143, which pipe communicates both with the interior passage 34 of the shaft 21 and the main vacuum-pipe 118. The opening of this valve therefore immediately creates a vacuum in such pipe 143 and passage 34, causing the sheet of metal on the roll 32 to be sucked and tightly held on such roll, it being further held to the roll during the process of forming the cylinder by the pressure of the spring-actuated arm 216, as hereinbefore explained. Upon the completion of the interlocking of the ends of the sheet-metal cylinder the suction upon such cylinder will be released by the breaking of the vacuum in the central passage 34 of the shaft 21 and in that portion of the pipe 143 from the point where it communicates with such central passage to the valve in the casing 145, such breaking or destroying of the vacuum in these parts being caused by the timing of the movement of the cam to cause such cam to release its pressure on the lever 127, so that through the spring 148 the valve in the casing 145 may be pulled to its seat. It will be understood that when this last-named valve is seated, as just described, the remaining portion of the pipe 143 will still have a vacuum maintained in it by reason of its communication with the main vacuum-pipe 118.

The operations described will of course be repeated at regular intervals as successive sheets are fed forward between the forming-rolls, and when the last sheet from the table 81 has been fed forward, unless a new pile of sheets be added, the machine should be stopped by the attendant, which can be done by shifting the driving-belt from the fast to the loose pulley through the hand-lever 226.

If for any reason the metal sheet is not fed between the rolls properly, so as to completely cover the series of openings 33, that communicate with the longitudinal passage 34 in the shaft 21, or in case a sheet is properly fed, but is broken so that air can pass through it and through the said passages 33, or for any other reason such series of openings 33 are not at all proper times completely covered by the sheet, the machine will be almost instantly stopped before damage can be done to the rolls or other parts, and such stoppage of the machine is effected by reason of the breaking of the vacuum in the longitudinal passage 34 and communicating pipe 143, which results from air being admitted to the said passage in the pipe through the openings 33. As this takes place the air passing through the pipe 143 enters the short pipe 150 and the cylinder 151. The piston-head in the cylinder had theretofore been held up in the cylinder by the weight of the atmosphere below said head against the pressure of the coiled spring 154 around its stem 152, which, with the admission of air above the piston-head in such cylinder 151, immediately acts to draw such piston-head and attached stem or piston 152 down and as a result causes a jerk on the chain 169, that is attached to the bell-crank lever 167, causing said bell-crank lever to turn on its pivot 168, and by reason of its turned end bearing against the pivoted inner ends of the toggle-levers 163 164 such toggle-levers will be pushed inward, thus allowing the coiled spring 162 to immediately force down the rod or stem 165 of the valve within the casing 160, which casing, as heretofore described, is in the pipe 159, that connects the cylinder 155 and pipe 143. The effect of this is to immediately open the pipe 159, so that free communication is had between the rear end of the cylinder 155 and said pipe 143, causing a sufficient vacuum to be formed in the cylinder 155, so that the pressure of the atmosphere upon the outer face of the piston-head contained therein will force such piston-head back to the rear end of said cylinder, drawing with it the rod 178 and the belt-shifting devices 180 181, whereby the driving-belt will be at once shifted from the fixed pulley 22 to the loose pulley 23, and at the same time the lever 182, which through the link 184 is connected with said rod 178, will be turned on its pivot, bringing the brake 185 forcibly against the side of the cam-wheel 54 and almost immediately stopping the machine. It is true that at the time the cylinder 155 and pipe 143 are thrown into communication so as to effect the stoppage of the machine in the manner just described air from the passage 34 is passing freely through that portion of the pipe 143 up to the short branch pipe or nipple 150, and even passing beyond that to that portion of the pipe 143 that connects with the main pipe 118; but it will be noted that between the pipe 150 and the point of entrance of the pipe 159 into the pipe 143 the diameter of the pipe 143 is much reduced, a section of much smaller pipe, in fact, being introduced at this point, (indicated by 143$^a$,) in which is a reducing-valve 144$^a$, so that the passage of air through that small section of pipe is not in the small amount of time required to effect the stoppage of the machine sufficient to destroy or even greatly impair the vacuum depended upon for the performance of this duty.

Referring now to the operation of the parts for adjusting each sheet of metal after it has passed over the corrugated roll 84, so that each sheet will lie exactly right to be properly presented between the rolls 32 and 35, which parts are best shown in Figs. 8, 9, 10, and 11, as the shaft 31 rotates the cam 189 thereon will cause the bell-crank lever 186 to so move as to cause the upper end of its long arm to be projected, thereby forcing the inclined edge of the plate 191 against the roller 203, that is secured to the rod 192, causing such rod 192 to be moved laterally and of course drawing back the guide 193, that projects through and moves in the transverse slot 194 in the table 81, such guide being drawn back far enough to clear the edge of the advancing sheet and then during the continued operation of the machine being pulled toward such sheet by a light coiled spring 227, that is attached at one end to the rod 192 and at its other end to the frame of the machine. Such guide 193 will be drawn in toward the sheet sufficiently to allow such sheet to fit snugly between the upturned opposite edge of the feed-table and the said guide, but not tight enough to cause any material amount of friction between the edges of the sheet and said upturned side of the table and the guide. As before explained, the limit of movement of the guide is controlled by the screw-threaded stem 196, the end of which is adapted to abut against the inner end of the slot, and therefore the inward movement of the guide can be regulated to suit varying widths of sheets. At the same time that the guide 193 is operated in the manner described the longitudinally-movable guide will also be operated, inasmuch as it is connected to the upper end of such bell-crank lever through the rod 197, and as the rear end of the advancing sheets drops from between the roughened roll 84 and the bearing-rolls 90 it will drop in front of the longitudinally-movable guide 198, being assisted in dropping down into this position by the weight of the arm 214, whereupon through the moving back of the long arm of the bell-crank lever 186 the said guide 198 will be positively pulled forward, pushing in advance of it the sheet of metal, which will be directed so that its forward or leading edge is presented squarely between the forming-rolls.

The operation of the devices for "stripping" or removing a completed can-body from the roll 32 has been, it is believed, sufficiently described in connection with the description of the construction of such devices, and it will be understood that the can-body that is removed from such roll 32 onto the roll 60 is afterward pushed off of the end of said roll 60 by the next succeeding can-body that is formed on the roll 32, when such last-named can-body is pushed from said roll 32, as explained in my said former patent.

It is desirable that the machine should not be stopped from time to time whenever the supply of sheets of material on the table 81 requires to be replenished. To avoid such stoppage, I add as required additional sheets to the diminished pile on the table by sliding such bunch of sheets beneath such sheets as are on the table, which I am enabled to readily do by resting the forward edge of the additional bunch of sheets on a plate 228, that projects outwardly and downwardly from the central part of the front edge of such table, such front edge itself also being curved downward, and then forcing such sheets inward, so that they will slide up such plate 228 and onto the table. By this means I am enabled to add to the stock of material on the table as required without interfering with the operation of the machine and without danger or liability of having the forward edges of the sheets of material forced against and injuring the pneumatic picker-head.

I have described the arm 91 as being set so that but a single sheet of material can pass beneath its forward end, and it is so set in order that if for any cause two sheets of material should adhere so as to be fed forward together such double thickness would be prevented from passing to the forming-rolls, with the result that no material would be fed forward and the machine would be automatically stopped by reason of the passages 33 being left uncovered, as hereinbefore described.

What I claim as new, and desire to secure by Letters Patent of the United States, is as follows:

1. The combination with a roll, and means for rotating the same, of means for forming a cylinder on said roll, a device adapted to bear against one end of the cylinder formed on said roll, means for rotating said device, and means for moving said device longitudinally of said roll during its rotation, substantially as specified.

2. The combination with a roll, and means for rotating the same, of means for forming a cylinder on said roll, a device slidingly secured to said roll, and adapted to bear against one end of a cylinder formed on said roll and rotating with said roll, and means for moving said device longitudinally of said roll during its rotation, substantially as specified.

3. The combination with a roll, and means for rotating the same, of means for forming a cylinder on said roll, a ring surrounding said roll, means for compelling said ring to rotate with the rotation of the roll, and means for moving the ring longitudinally of the roll during its rotation, substantially as specified.

4. The combination with a roll, and means for rotating the same, said roll having a longitudinal groove in its face, of means for forming a cylinder on said roll, a ring surrounding said roll, and provided with an inward projection adapted to enter said groove, whereby said roll and ring will rotate together, and means for moving the ring longitudinally of the roll to remove the cylinder therefrom, substantially as specified.

5. The combination with a roll, and means for rotating the same, of means for forming a cylinder thereon, a reciprocating head carrying means for engaging the edge of a cylinder formed on said roll in order to remove the cylinder from the roll, a rearwardly-extending rod connected to said head, means for reciprocating said rod, a frame for supporting said devices, a guide secured to said frame, and an arm connected with said rod and projecting into and movable in said guide, substantially as specified.

6. The combination with a roll, and means for rotating the same, of means for forming a cylinder thereon, a reciprocating head, a semicylindrical shell secured to said head and partially surrounding said roll, and removed from the surface of said roll sufficiently far to permit a cylinder to lie between said roll and said shell, a ring rotatable with said roll and adapted to engage one edge of a cylinder formed thereon, and means for moving said head and semicylindrical shell and ring longitudinally of the roll, substantially as specified.

7. The combination with a roll, and means for rotating the same, of means for forming a cylinder thereon, a reciprocating head carrying means for engaging the edge of a cylinder formed on said roll in order to remove the cylinder from the roll, means for reciprocating said head, a bell-crank lever pivotally connected with said head, and carrying a presser-arm adapted to bear against a cylinder that is being formed on said roll, a fixed bar parallel with said roll, against which one end of said bell-crank lever bears, said fixed bar being adapted to hold said presser-arm away from the roll when a cylinder is being removed from said roll, and to permit it to bear against a cylinder during the process of forming such cylinder, and a spring adapted to hold said presser-arm against such cylinder, substantially as specified.

8. The combination with a roll, and means for rotating the same, of means for forming a cylinder thereon, a reciprocating head carrying means for engaging the edge of a cylinder formed on said roll in order to remove the cylinder from the roll, means for reciprocating said head, a bell-crank lever pivotally connected with said head and carrying a presser-arm adapted to bear against a cylinder while the same is being formed on said roll, a fixed bar parallel with said roll, against which one end of said bell-crank lever bears, said fixed bar being provided with a notch near its inner end to receive the outer end of said bell-crank lever, and a spring adapted to hold said presser-bar against a cylinder being formed on said roll when the end of said bell-crank lever is in said notch, substantially as specified.

9. The combination with a roll, and means for rotating the same, said roll being adapted to have passed over it a sheet of material, and having a passage extending through the surface of said roll and communicating with a suitable chamber, of means for automatically producing a vacuum in said chamber and passage when said passage is covered by a sheet of material, whereby said sheet of material will be held to said roll, and means for automatically destroying the vacuum after a predetermined period of time, substantially as specified.

10. The combination with a roll, and means for rotating the same, said roll being adapted to have passed over it a sheet of material, and having a plurality of radial passages extending through the surface of said roll, each of said passages communicating with a suitable chamber, of means for automatically producing a vacuum in said chamber and said passages when each of said passages is covered by a sheet of material, whereby said sheet of material will be held to said roll, and means for automatically destroying the vacuum after a predetermined period of time, substantially as specified.

11. The combination with a roll, and means for rotating the same, said roll being adapted to have passed over it a sheet of material, and having a passage extending through the surface of said roll and communicating with a suitable chamber, of means for automatically producing a vacuum in said chamber and passage when said passage is covered by a sheet of material, whereby said sheet of material will be held to said roll, means for automatically destroying the vacuum after a predetermined period of time, and means for automatically removing the sheet of material from the roll at the expiration of such period of time, substantially as specified.

12. The combination with a roll, and means for rotating the same, of means for feeding successive sheets of material over the roll, said roll being provided with a passage extending through its surface and communicating with a suitable chamber, means for automatically producing a vacuum in said chamber and passage when said passage is covered by a sheet of material, whereby such sheet will be held to said roll, means for operating on such sheet while on the roll, and means for automatically destroying the vacuum after a predetermined period of time, substantially as specified.

13. The combination with a roll, and means for rotating the same, of means for feeding successive sheets of material over the same, said roll being provided with a passage extending through its surface and communicating with a suitable chamber, means for automatically producing a vacuum in said chamber and passage when said passage is covered by a sheet of material, whereby such sheet will be held to said roll, means for operating on such sheet while on the roll, means for automatically destroying the vacuum after a predetermined period of time, and means for automatically removing such sheet after such vacuum has been destroyed, substantially as specified.

14. The combination with a roll, and means for rotating the same, of means for feeding successive sheets of material over the roll, said roll being provided with a passage extending through its surface and communicating with a suitable chamber, means for automatically producing a vacuum in said chamber and passage when said passage is covered by a sheet of material, whereby such sheet will be held to said roll, means for operating on such sheet while it is on the roll, and means for automatically stopping the rotation of such roll in case the said passage in the roll becomes uncovered before the operation on the said sheet of material is completed, substantially as specified.

15. The combination with a roll, and means for rotating the same, of means for forming a cylinder thereon, said roll having a passage extending through its surface and communicating with a suitable chamber, of means for automatically producing a vacuum in said chamber and passage when said passage is covered by such cylinder that is being formed thereon, whereby such cylinder will be held to said roll, means for automatically destroying the vacuum after the formation of such cylinder, and means for automatically removing the cylinder from the roll during the time that such vacuum is destroyed, substantially as specified.

16. The combination with a frame, of a shaft supported thereon and provided with a passage extending through one end of the shaft, a roll secured on said shaft and provided with a passage extending through the surface of the roll and communicating with the passage in the shaft, means for driving said shaft and roll, means coöperating with said roll for operating on a sheet of material fed to said roll, means for producing a vacuum in said passages in the roll and shaft when the passage in the roll is covered with a sheet of material, and means for destroying said vacuum to permit the removal of the material mentioned without stopping the rotation of such shaft and roll, substantially as specified.

17. The combination with a frame, of a shaft supported thereon and provided with a passage extending through one end of the shaft, a roll secured on said shaft and provided with a passage extending through the surface of the roll and communicating with the passage in the shaft, means for driving said shaft and roll, means coöperating with said roll for operating on a sheet of material fed to such roll, means for producing a vacuum in the said passages in the roll and shaft when the passage in the roll is covered with a sheet of material, means for destroying such vacuum without stopping the rotation of such shaft and roll, and means for removing the material referred to from the roll during the time that such vacuum is destroyed, substantially as specified.

18. The combination with a frame, of a shaft supported therein and provided with a passage extending through one end of the shaft, a roll secured on said shaft and provided with a passage extending through the surface of the roll and communicating with the passage in the shaft, means for driving said shaft and roll, means coöperating with said roll for operating on a sheet of material fed to said roll, a pipe communicating with the passage in said shaft, a valve in said pipe, means for normally holding said valve across said pipe, means for intermittently opening said valve, and means for producing a vacuum in said pipe and passages when said valve is opened, substantially as specified.

19. The combination with a frame, of a shaft supported therein and provided with a passage extending through one end of the shaft, a roll secured on said shaft and provided with a passage extending through the surface of the roll and communicating with the passage in the shaft, means for driving said shaft and roll, means coöperating with said roll for operating on a sheet of material fed to said roll, a pipe communicating with the passage in said shaft, a valve in said pipe, a second shaft, means for driving the same, a cam on said last-named shaft, suitable connections between said valve and cam whereby said valve is caused to open at regular intervals, and means for producing a vacuum in said pipe and passages when said valve is opened, substantially as specified.

20. The combination with a frame, of a shaft supported therein and provided with a passage extending through one end of the shaft, a roll secured on said shaft and provided with a passage extending through the surface of the roll and communicating with the passage in the shaft, means for driving said shaft and roll, means coöperating with said roll for operating on a sheet of material fed to said roll, a pipe communicating with the passage in said shaft, a valve in said pipe, means for normally holding said valve across said pipe, means for intermittently opening said valve, means for producing a vacuum in said pipe and passages when said valve is opened, and means communicating with said pipe and located between said valve and the vacuum-producing means for stopping the rotation of said shaft and the roll thereon when the vacuum in said passages is destroyed, substantially as specified.

21. The combination with a frame, of a shaft supported therein and provided with a passage extending through one end of the shaft, a roll secured on said shaft and provided with a passage extending through the surface of the roll and communicating with the passage in the shaft, means for driving said shaft and roll, means coöperating with said roll for operating on a sheet of material fed to said roll, a pipe communicating with the passage in said shaft, a valve in said pipe, means for normally holding said valve across said pipe, means for intermittently opening said valve, means for producing a vacuum in said pipe and passages when said valve is opened, means communicating with said pipe and located between said valve and the vacuum-producing means for stopping the rotation of such shaft and the roll thereon when said vacuum in said passages is destroyed, said stopping means comprising a cylinder, a piston movable therein, a power-shifting device connected with said piston, and means for exhausting the air in said cylinder behind said piston, substantially as specified.

22. The combination with a frame, of a shaft supported therein and provided with a passage extending through one end of the shaft, a roll secured to said shaft and having a passage extending through the surface of the roll and communicating with the passage in the shaft, means for driving such shaft and roll, means coöperating with said roll for operating on a sheet of material fed to said roll, a pipe communicating with said passage in the shaft, a device for lifting a sheet of material, a flexible hollow connection between said lifting device and said pipe, means for creating a vacuum in said pipe, passages and connection, means for moving said lifting device and attached sheet of material toward said roll while such vacuum is maintained and for moving said lifting device away from such roll after the vacuum is destroyed, and means for destroying such vacuum, substantially as specified.

23. The combination with a frame, of a shaft supported thereby and provided with a passage extending through one end of the shaft, a roll secured to said shaft and having a passage extending through the surface of the roll and communicating with the passage in the shaft, means for driving said shaft and roll, means coöperating with said roll for operating on a sheet of material fed to such roll, a pipe communicating with said passage in the shaft, a device for lifting a sheet of material, a flexible hollow connection between said lifting device and said pipe, means for creating a vacuum in said pipe, passages and connection, means for moving said lifting device and attached sheet of material toward said roll while such vacuum is maintained, and for moving said lifting device away from such roll after the vacuum is destroyed, means for destroying such vacuum, a feed-roll in front of said first-named roll, which is adapted to receive the sheet of material from said lifting device, and means for driving said feed-roll to move said sheet of material toward said first-named roll, substantially as specified.

24. The combination with a frame, of a shaft journaled therein, a roll mounted thereon, a vacuum-pipe, a table adapted to support a pile of sheets of material, a pneumatic picker located over said table, a flexible connection between said picker and pipe, means for raising and lowering said picker, means for reciprocating said picker toward and from said roll, means for intermittently creating and destroying a vacuum in said pipe and picker, and in the connection between them, a feed-roll adapted to receive upon it a sheet of material carried forward by the picker, and means for continuously rotating said feed-roll, substantially as specified.

25. The combination with a frame, of a shaft journaled therein, a roll mounted thereon, a vacuum-pipe, a table adapted to support a pile of sheets of material, a pneumatic picker located over said table, a flexible connection between said picker and pipe, means for raising and lowering said picker, means for reciprocating said picker toward and from said roll, means for intermittently creating and destroying a vacuum in said pipe, and picker, and in the connection between them, a feed-roll, a pressure-roller bearing thereon, between which feed-roll and roller a sheet of material carried by said picker is adapted to be fed, and means for continuously driving said feed-roll, substantially as specified.

26. The combination with a frame, of a shaft journaled therein, a roll mounted thereon, a vacuum-pipe, a table adapted to support a pile of sheets of material, a pneumatic picker located over said table, a flexible connection between said picker and pipe, means for raising and lowering said picker, means for reciprocating said picker toward and from said roll, means for intermittently creating and destroying a vacuum in said pipe and picker, and in the connection between them, a feed-roll adapted to receive upon it a sheet of material carried forward by the said picker, means for continuously rotating said feed-roll, an arm pivoted at its forward end, a pressure-roll carried at the rear end of said arm, and adapted to bear upon the material passing over said feed-roll, and a spring acting to hold said arm and roller down, substantially as specified.

27. The combination with a supporting-table, of means for successively feeding sheets of material forward thereon, a pair of guides movable at right angles to each other, and each adapted to contact one edge of a sheet of material, and means for simultaneously moving said guides, substantially as specified.

28. The combination with a supporting-table of means for successively feeding sheets of material forward thereon, a pair of guides movable in ways formed in said table, and at right angles to each other, and means for simultaneously moving said guides, substantially as specified.

29. The combination with a supporting-table, of means for successively feeding sheets of material forward thereon, a laterally-movable guide, means for drawing such guide back out of the way of an advancing sheet of material, and means for moving it inward to contact the side edge of such advancing sheet of material, substantially as specified.

30. The combination with a supporting-table, of means for successively feeding sheets of material forward thereon, a laterally-movable guide, a rod attached to such guide, a movable arm adapted to bear upon a projection on said rod to force it outward, means for moving said arm, and a spring for moving said rod inward, substantially as specified.

31. The combination with a supporting-table, of means for successively feeding sheets of material forward thereon, a laterally-movable guide, a bent rod attached to said guide, a contact-piece on such rod, a plate with an inclined edge adapted to bear against said contact-piece on said rod, means for moving said plate, and a spring acting to draw said rod inward, substantially as specified.

32. The combination with a supporting-table, of means for successively feeding sheets of material forward thereon, a laterally-movable guide, a rod attached to such guide, a movable arm adapted to bear upon a projection on said rod to force it outward, means for moving said arm, a spring for moving said rod inward, a second guide movable at right angles to the movement of said first-named guide, and a connection between it and the means for moving said arm, whereby both of said guides are moved simultaneously, substantially as specified.

33. The combination with a supporting-table, of a rocking arm, an inclined or cam-shaped member carried by said arm, a laterally-movable rod and a contact-piece on said rod adapted to be engaged by said inclined or cam-shaped member, a guide carried by said rod and adapted to contact the side edge of a sheet of material on said table, and a spring for drawing said guide inward to effect a contact with the sheet of material on the table, substantially as specified.

34. The combination with a supporting-table, of a rocking arm, means for rocking the same, an inclined or cam-shaped member carried by said arm, a laterally-movable rod, a contact-piece secured to said rod, and adapted to be engaged by said inclined or cam-shaped member to force said rod outward when said arm is moved in one direction, a guide carried by said rod and adapted to engage the side edge of a sheet of material on said table, a spring acting to draw said rod and attached guide inward, and a second guide adapted to move at right angles to the movement of said first-named guide, and a connection between it and said rocking bar, whereby, upon the movement of said bar, both guides will be moved simultaneously, substantially as specified.

35. The combination with a roll, and means for driving the same, of means for forming a cylinder thereon, a shaft, means for rocking said shaft, an arm attached thereto and projecting toward said roll, and a contact device carried by said arm, and adapted, upon the rocking of said shaft, to be forced against a cylinder formed on said roll, substantially as specified.

36. The combination with a roll, and means for driving the same, of means for forming a cylinder thereon, a shaft, means for rocking said shaft, an arm secured thereto and projecting toward said roll, an adjustable contact device carried by said arm, and adapted, upon the rocking of said shaft, to be forced against a cylinder formed on said roll, substantially as specified.

37. The combination with a roll, and means for driving the same, of means for forming a cylinder thereon, a shaft, a disk secured on said shaft, and provided with a notch, means for driving such shaft, a rock-shaft having two arms secured thereto, one of which arms is adapted to bear against said notched disk, and the other of which projects toward said roll and is provided with a contact device adapted to be forced against a cylinder formed on said roll whenever the end of the first-named arm enters the notch in said disk, substantially as specified.

38. The combination with a supporting-frame, and a shaft journaled therein and projecting beyond said frame, of a movable device located below said shaft, and means for intermittently moving said device upward against said projecting end of the shaft to furnish temporary support thereto, substantially as specified.

39. The combination with a frame, and a shaft journaled therein and projecting at one end therefrom, of a ring fitting over the end of said shaft, a movable device located below said shaft, and means for intermittently moving said device upward against said ring to furnish temporary support to said projecting end of the shaft, substantially as specified.

40. The combination with a frame, and a shaft journaled therein and projecting at one end therefrom, of a lever pivotally secured below such projecting end, and means for intermittently forcing said lever into contact with said projecting end of the shaft, whereby a temporary support for such projecting end is provided, substantially as specified.

41. The combination with a frame, and a shaft journaled therein and having one end projecting therefrom, of a bell-crank lever pivotally supported beneath such projecting end, a second shaft, a cam secured thereto against which one end of said bell-crank lever bears, and means for driving said second shaft, substantially as specified.

42. The combination with a frame, of a shaft journaled therein and having one end projecting therefrom, a bell-crank lever pivotally secured below such projecting end, an adjustable contact device carried by one arm of said lever and adapted to be forced against the under surface of said shaft, a second shaft, a cam secured thereto against which one end of said bell-crank lever is adapted to bear, and means for driving said second shaft, substantially as specified.

43. The combination with a roll, and means for rotating the same, of means coöperating with said roll for forming a cylinder thereon, a pivoted lever having one end adjacent to said roll, mechanism for stopping the rotation of such roll, and a device carried by said lever adapted to be forced against such stopping mechanism when said lever is contacted by an imperfect cylinder passing from said roll, substantially as specified.

44. The combination with a table adapted to hold a pile of sheets of material, of a downwardly-projecting plate extending out from the receiving end of said table to enable additional sheets of material to be placed on the table beneath other sheets previously placed on the table, substantially as specified.

45. The combination with a table adapted to support a pile of sheets of material, a roll adapted to receive sheets of material from said table and having a passage extending through the surface of said roll, means for driving said roll, means for feeding sheets of material successively from said table to said roll so as to lie over said passage, means for creating a vacuum in said passage at the time it is covered by a sheet of material, means for preventing the passage of more than a single sheet of material at one time from the table to the roll, and means for stopping the operation of the machine, through the destruction of said vacuum, in case more than a single sheet is attempted to be passed at one time from the table to the roll, substantially as specified.

46. The combination with a table adapted to support a pile of sheets of material, a roll adapted to receive sheets of material from said table and having a passage extending through the surface of said roll, means for driving said roll, means for feeding sheets of material successively from said table to said roll so as to lie over said passage, means for creating a vacuum in said passage at the time it is covered by a sheet of material, a device raised from the table sufficiently to permit but a single sheet of material to pass thereunder, and means for stopping the operation of the machine, through the destruction of said vacuum, in case more than a single sheet is attempted to be passed at one time from the table to the roll, substantially as specified.

GEORGE F. LEIGER.

Witnesses:
JULIA M. BRISTOL,
HUGH C. PEARSON.